US012390951B2

(12) United States Patent
Wrobel

(10) Patent No.: US 12,390,951 B2
(45) Date of Patent: Aug. 19, 2025

(54) STUD NOTCHING SYSTEM

(71) Applicant: Robert B. Wrobel, Norwood Park, IL (US)

(72) Inventor: Robert B. Wrobel, Norwood Park, IL (US)

(*) Notice: Subject to any disclaimer, the term of this patent is extended or adjusted under 35 U.S.C. 154(b) by 911 days.

(21) Appl. No.: 15/469,498

(22) Filed: Mar. 25, 2017

(65) Prior Publication Data

US 2017/0274551 A1 Sep. 28, 2017

Related U.S. Application Data

(60) Provisional application No. 62/313,736, filed on Mar. 26, 2016.

(51) Int. Cl.

| | |
|---|---|
| ***B27F 1/04*** | (2006.01) |
| ***B27C 5/00*** | (2006.01) |
| ***B27F 1/00*** | (2006.01) |
| ***B27F 5/02*** | (2006.01) |
| ***B27M 3/00*** | (2006.01) |
| *E04B 2/74* | (2006.01) |

(52) U.S. Cl.
CPC .................. *B27F 1/04* (2013.01); *B27C 5/00* (2013.01); *B27F 1/00* (2013.01); *B27F 5/02* (2013.01); *B27M 3/00* (2013.01); *E04B 2002/7488* (2013.01)

(58) Field of Classification Search
CPC ...... B27F 1/00; B27F 1/04; B27F 5/00; B27F 5/12; B27M 3/00
See application file for complete search history.

(56) References Cited

U.S. PATENT DOCUMENTS

| | | | | |
|---|---|---|---|---|
| 3,289,718 | A | 12/1966 | Willis | |
| 3,700,344 | A * | 10/1972 | Grumbach ................ | B27F 5/12 144/27 |
| 6,176,057 | B1 | 1/2001 | Bouchet et al. | |
| 6,193,449 | B1 | 2/2001 | Diaz | |
| 6,343,632 | B1 * | 2/2002 | Zivojinovic .......... | B23B 47/287 144/27 |
| 6,954,989 | B1 | 10/2005 | Morton | |
| 7,316,527 | B2 | 1/2008 | Trettin et al. | |
| 8,082,701 | B1 | 12/2011 | Wendel | |
| 2010/0089496 | A1 * | 4/2010 | Barnes ...................... | B27C 5/10 144/48.6 |

* cited by examiner

*Primary Examiner* — Matthew Katcoff
(74) *Attorney, Agent, or Firm* — Adriene Naumann; William Hallihan; David Bremer

(57) ABSTRACT

A notch cutting system includes a cutter guide that connects to a workpiece and establishes a cutting path for notching the workpiece. A notch cutter with a cylindrical cutting element engages the cutter guide. A rotary driver rotates the cutting element to remove workpiece material as the notch cutter traverses the aperture and the notch cutting system cuts a full-radius notch in the workpiece along the cutting path.

3 Claims, 5 Drawing Sheets

STUD NOTCHING SYSTEM

The invention is a mechanical system configured to cut a path, herein called a "notch," in a workpiece. The notching system comprises components such as a notch cutter and a cutter guide that may interact to produce a consistently repeatable notch when applied to one or more workpieces. In one application, the notches may be configured to recess electrical conduit extending across a succession of vertical studs in building construction. Various other applications for utilizing the notching system are envisioned by the inventor.

DETAILED DESCRIPTION OF THE INVENTION

In at least one envisioned application of the invention, it may be useful to provide a consistently sized and positioned notch in one or more workpieces. For a building application, notching a line of wall studs to accept an electrical conduit (or pipe) is a common requirement. For example, a consistent series of notches in a line of wall studs may enable an electrical conduit to extend along (e.g., inside) a wall without disturbing a smooth drywall surface covering the wall studs. Currently, one method of providing the necessary notches is to snap parallel chalk lines across the line of studs, spaced apart to accommodate the conduit. A circular saw is used to make appropriately deep cuts along the chalk lines and then the material between the cuts is chiseled away to form the notches. This process works fine but is labor-intensive and the resulting notches are rough-formed with sharp inner corners that act as stress concentrators—potentially reducing the support capability of the studs. The notch cutting system provides significant advantages over currently used means and methods of notch cutting. For example, the notch cutting system can notch a stud in a single pass with a single tool. Also, the resulting notches have full-radiused inner corners and distribute the supported loads more uniformly.

Figure 1:
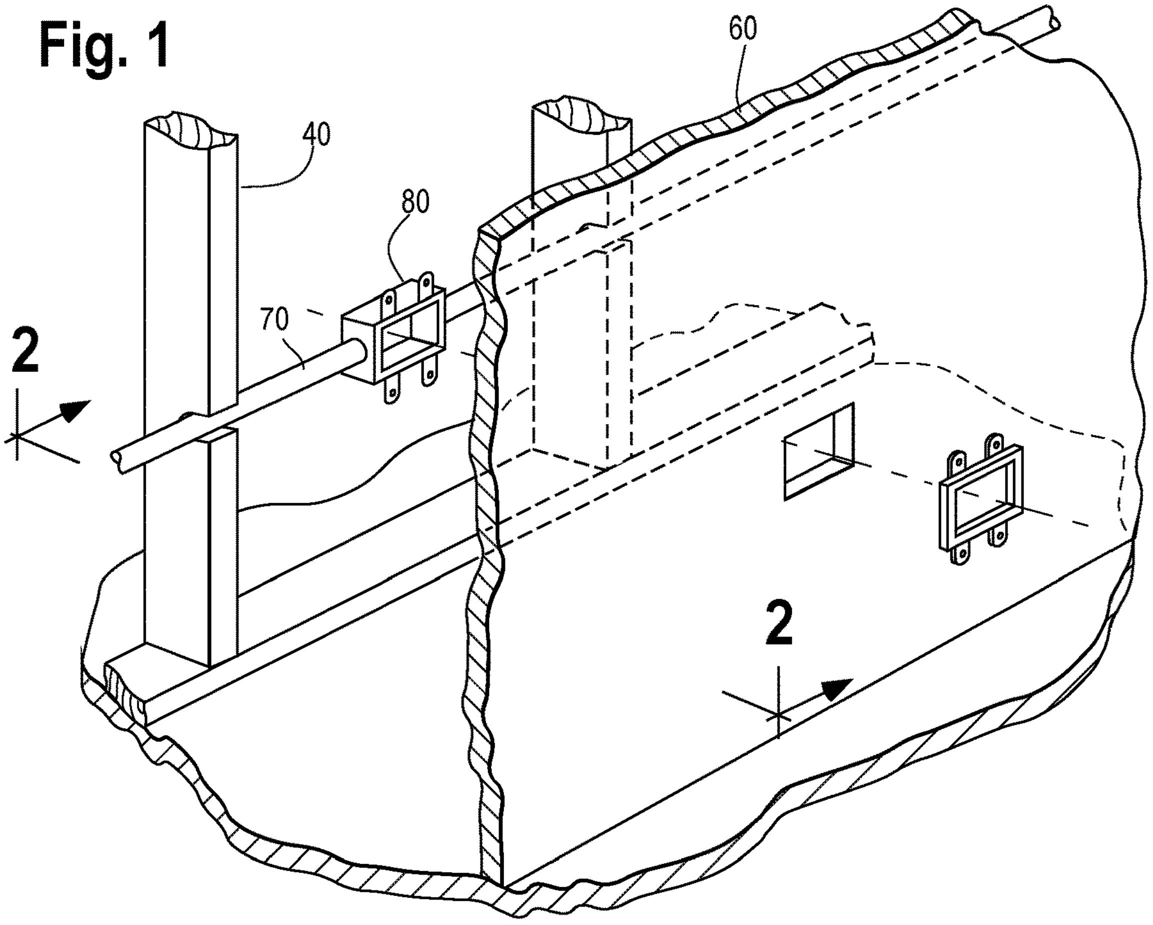
FIG. 1 is an exploded view of a stud and drywall installation including embedded electric conduit.

FIG. 1 is an exploded view of a stud and drywall installation including electrical conduit seated in notches cut by the notch cutting system. It is generally desirable to install electrical conduit that feeds electrical boxes (e.g., housing light switches, electric sockets, etc.) behind the drywall facade to provide an uncluttered and clean wall surface. The electric boxes themselves may be mounted for access in a hole cut in the drywall either medial the underlying studs or mounted directly to a stud.

Figure 2:
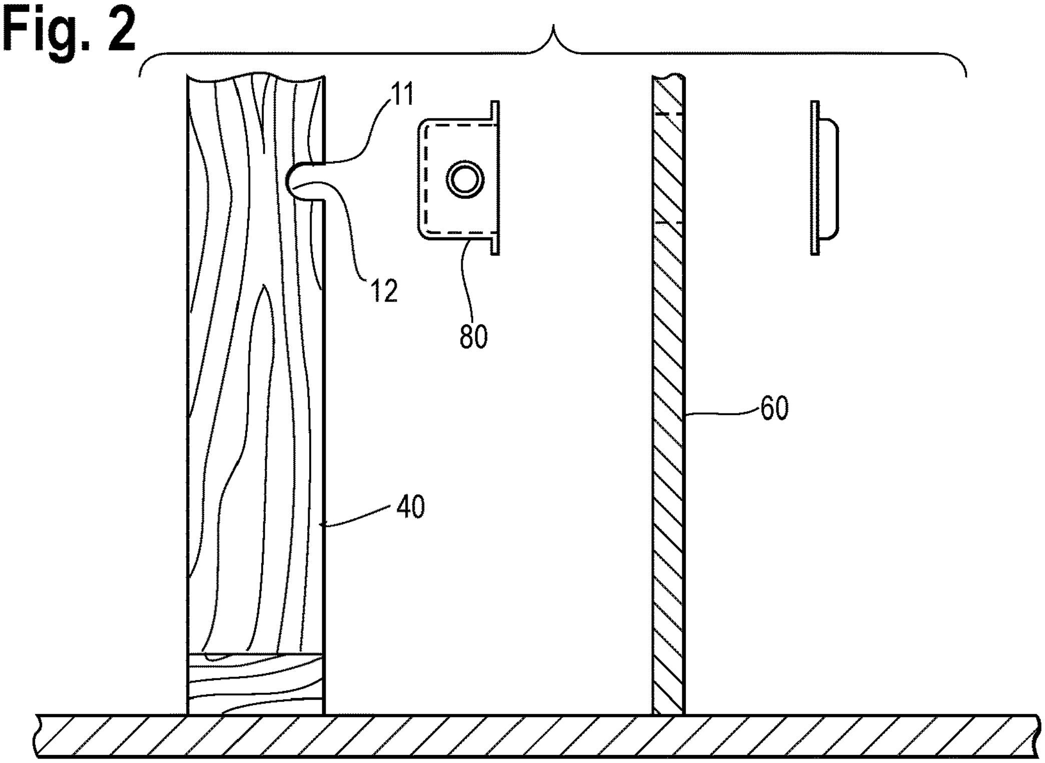
FIG. 2 is a section view of the installation of FIG. 1 showing the conduit seated in the radiused notch.

FIG. 2 shows a side view of the exploded drywall installation over the embedded conduit. By notching the studs 40 to accommodate the electrical conduit 70, the drywall 60 can overlay the conduit 70 and fasten securely to the studs 40 while maintaining its desirable flat and smooth appearance. The notch 11 clearly shows the full radius 12 that is typical of notches cut by the notch cutting system.

Figure 3:
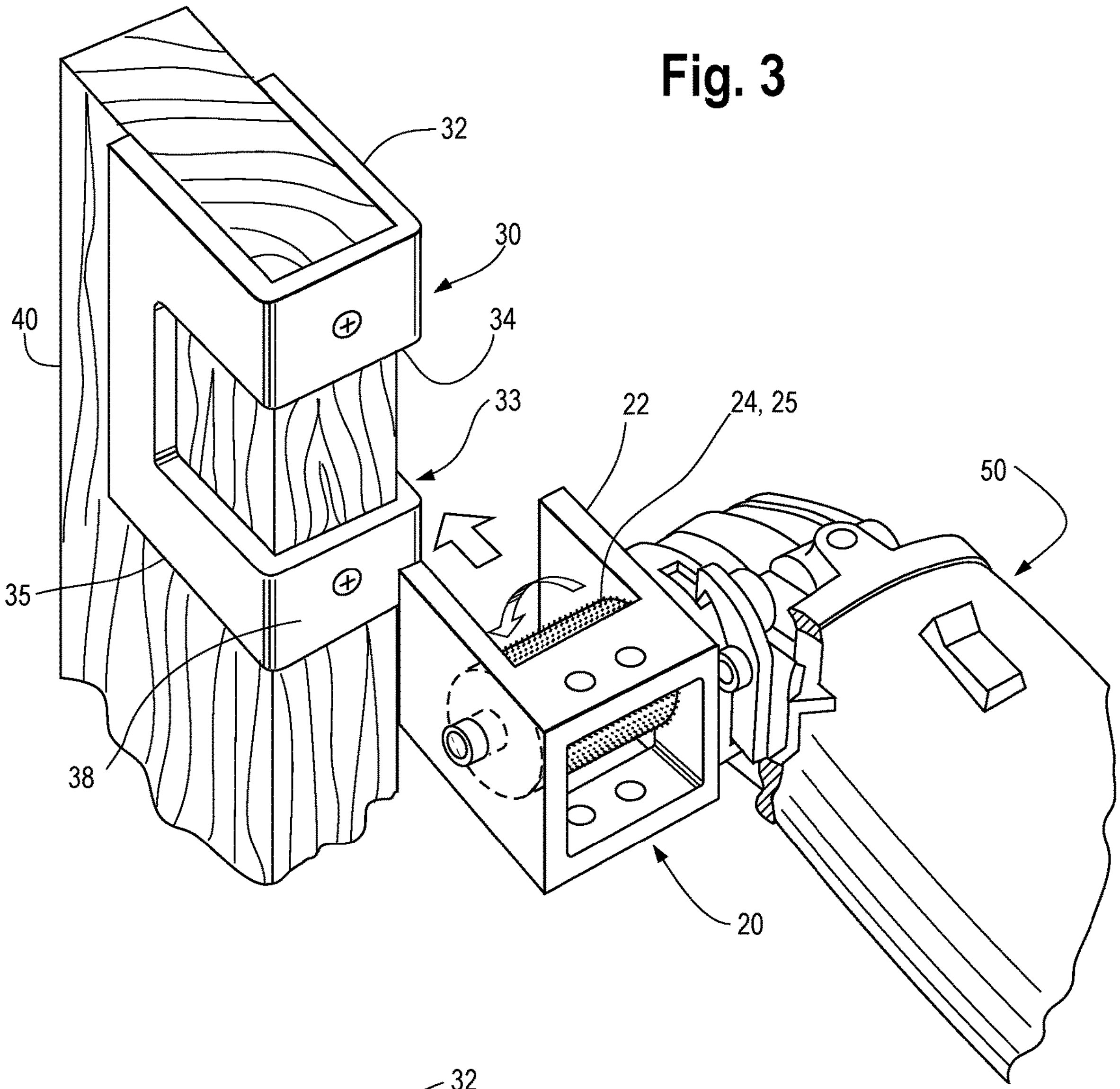
FIG. 3 is a perspective view of an embodiment of the invention prior to producing a notch in a workpiece.

FIG. 3 shows an embodiment of the notch cutting system 10 and a workpiece 40 (e.g., a 2×4 wooden stud) that is to be notched. The notch cutting system 10 includes a notch cutter 20 that includes a cylindrical cutting element 24, and a cutter guide 30. The cutter guide 30 mounts directly to the workpiece 40 and the notch cutter 20 engages the cutter guide 30 to cut a notch in the workpiece 40 along a defined cutting path. The notch cutter 20 connects to a rotary driver 50 that rotates the cutting element 24 to cut a notch in the workpiece 40. Thus, the notch cutting system 10 enables a user to mount the cutter guide 30 to successive wall studs and cut a substantially identical notch in each wall stud. "Substantially," as used here and throughout, is meant to include minor dimensional and/or positional variations resulting from common manufacturing tolerances, wear, and human error.

The cutter guide 30 includes various features and characteristics. The guide 30 has an aperture 33 that accepts the notch cutter 20. The aperture 33 has one or more aperture edges 34 that may facilitate positioning the cutter guide 30 on the workpiece 40. Similarly, the aperture 33 has a top edge 32 and a bottom edge 35.

Once positioned, the cutter guide 30 may be fixed to the workpiece 40 via a mounting fixture, for example, by driving a fastener into the workpiece 40 through the mounting hole 38. In another example, a cutter guide may be fixed to the workpiece by friction such as by the cutter guide squeezing the workpiece when mounted. Similarly, the cutter guide may be mounted using one or more clamps, and various other mounting methods can be easily envisioned by those familiar with the art. In some cases, a user may utilize a plurality of cutter guides with a single notch cutter—for example, mounting a separate cutter guide to each of a plurality of wall studs to enable a user to move from one stud to the next, engaging the notch cutter with the successive cutter guides to quickly cut a series of notches without requiring repositioning of the cutter guide. Depending on the nature of the application, the notch cutter system can be used to facilitate notch cutting of a single workpiece or many workpieces without requiring the user to modify the general procedure of cutting notches with the inventive system.

Figure 4:
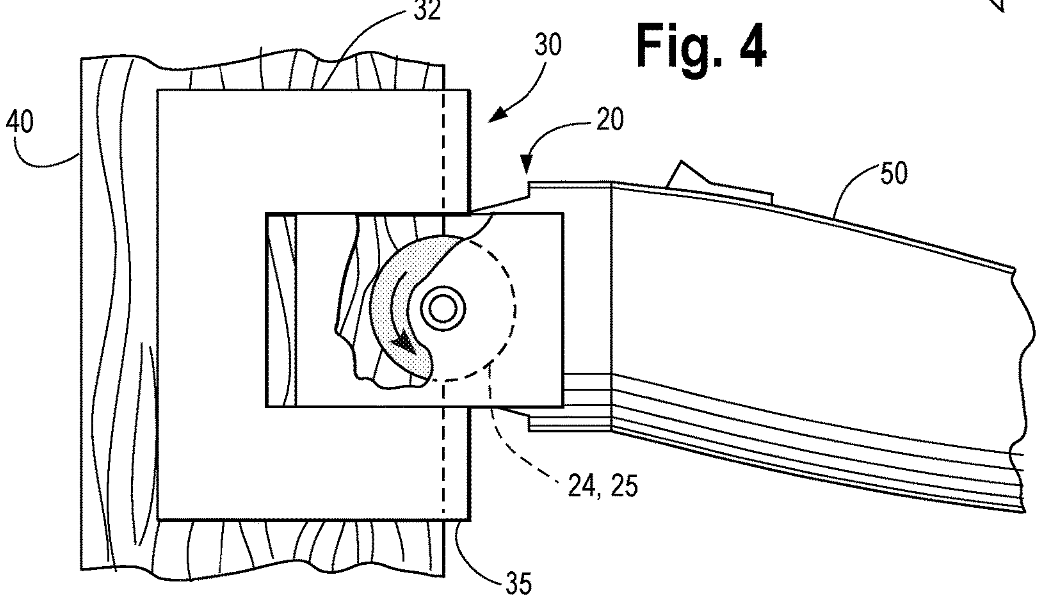
FIG. 4 is a side view of the embodiment shown in FIG. 3.

As shown in the side view of FIG. 4, the cutter guide 30 is attached to a workpiece 40 and exposes a portion of the workpiece through the aperture 33. The notch cutter sleeve engages the workpiece at the cutter guide aperture 33, and the cutter guide 30 aligns the notch cutter 20 to create the notch at a particular spot. Once engaged and with the driver rotating the cylindrical cutting tool 24, the notch cutter 20 moves into the aperture 33 while the cutting tool 24 removes material to create the notch. The notch cutter 20 moves into the aperture 33 until the cutter sleeve 32 contacts the back surface of the aperture 33 signaling the notch is complete and preventing the notch cutter 20 from plunging too deeply into the stud.

Figure 5:
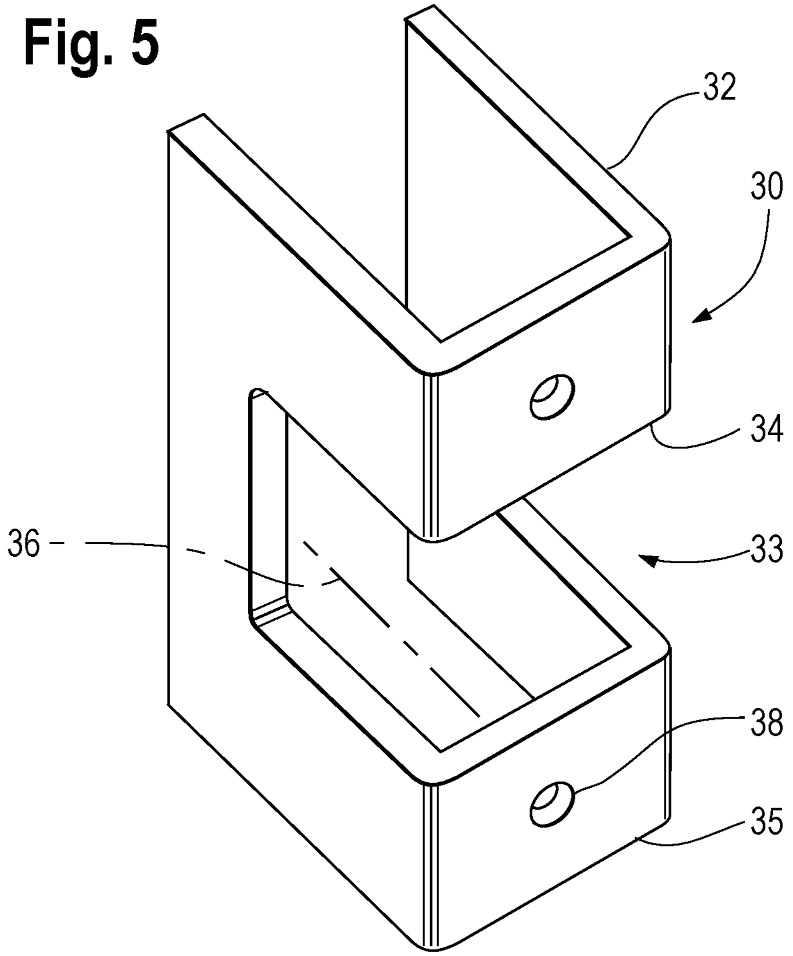
FIG. 5 is a perspective view of an exemplary cutter guide.

FIG. 5 shows the exemplary cutter guide 30 configured to connect to the workpiece 40. The cutter guide 30 comprises a cutter sleeve having an aperture medial the top and bottom edges. The aperture 33 is configured to expose a portion of the workpiece when the cutter guide 30 is mounted to the workpiece. The aperture 33 is further configured to engage the notch cutter 20 and to guide the notch cutter along a cutting path 36 defined by the aperture 33. In use, as the notch cutter proceeds along the cutting path 36 guided by the aperture 33, the cutting surface contacts the workpiece and removes workpiece material to form the notch. The cutter guide may be fashioned from various materials, such as metal, plastic, and other synthetic and composite materials. Similarly, the cutter guide may be sized to fit different workpieces. Some embodiments of cutter guides may be adjustable to fit more than one size workpiece.

In some embodiments, such as the embodiment comprising the cutter guide 30, the aperture 33 is configured to stop the notch cutter 20 at a predetermined depth within the workpiece. Other embodiments may rely on an operator to determine an appropriate depth for the notch. Some embodiments may be configured to provide apertures of varying sizes. Also, a cutter guide may comprise one or more mounting features for fixing the cutter guide in position on the workpiece. For example, the cutter guide 30 includes a mounting hole 38 through which a wood screw or other fastener may be driven into the workpiece.

In a typical application of the notch cutting system 10, a user may snap a single chalk line across a line of wall studs to establish an indicator corresponding to a desired position of an electrical conduit. The cutter guide 30 may be mounted to one of the wall studs such that the chalk line is aligned with a top edge 33, a bottom edge 35, or an aperture edge 34 of the cutter guide 30. Alternatively, various other measurements can be employed to position the cutter guide.

Figure 6:
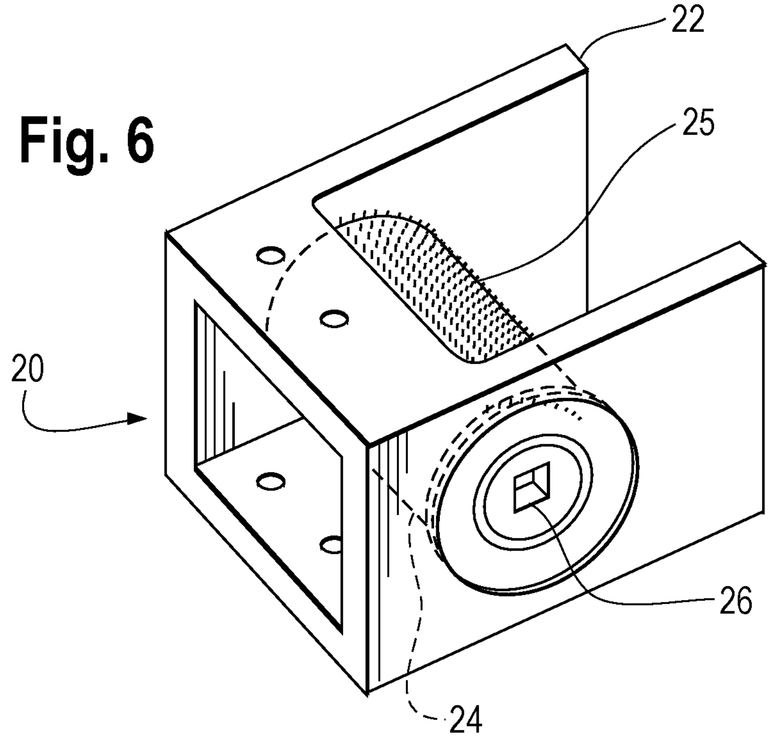
FIG. 6 is a perspective view of an exemplary notch cutter.

FIG. 6 shows an exemplary notch cutter 20. The notch cutter 20 may comprise a cutter frame 22 with a cylindrical cutting tool 24 mounted for rotation within the cutter sleeve 22. In one embodiment, the cylindrical cutting tool 24 may comprise a commercially available wood rasp with a cylindrical cutting surface 25 suitable for removing material from a wood workpiece. The cutting surface 25 comprises an abrasive material formed into a cylinder or, alternatively, a cylinder with an abrasive cover material. The abrasive material may be of various coarseness—from a fine coarseness to an extreme coarseness. Abrasive material may be commercially available sandpaper. Alternatively, the abrasive material may be specifically designed for wood removal such as coarse cutting elements fixed in epoxy or other media. The cylindrical cutting element is configured to rotate about its cylindrical axis and to remove material that contacts its outer cutting surface 25. The cutting element 24, configured as shown, will cut a notch approximately as wide as the diameter of the cutting element 24 and across a workpiece up to the axial length of the cutting surface 25. Further, the notch cut by the notch cutter 20 will have a full radius at its throat, thus providing superior load distribution when compared to other notches formed with chisels and circular saw cuts.

The notch cutter 20 includes a backside opening 28 which can accommodate a removable cover (possibly for cleaning or servicing the cutting element) and may also facilitate connection to a vacuum system to remove workpiece material during the cutting process.+

In the exemplary notch cutter 20, a drive connector 26 in the form of a square drive socket is provided to facilitate connecting to the rotary driver 50. Various drive connectors may be envisioned beyond the example drive socket and are considered to be within the aspect of the invention. For example, a rotary driver may comprise an electric angle grinder or an electric hand drill. The rotary driver may be battery powered and may be driven by compressed air. The drive connector may include additional features such as threaded holes, mounting pads, and even particular shapes of parts of the cutter sleeve, provided to facilitate connecting the notch cutter to various driver configurations. Also, as mentioned above, the cutting element may connect directly to the rotary driver and the cutting sleeve may be attached separately. Such a configuration would be considered within the basic aspects of the invention.

Figure 7:
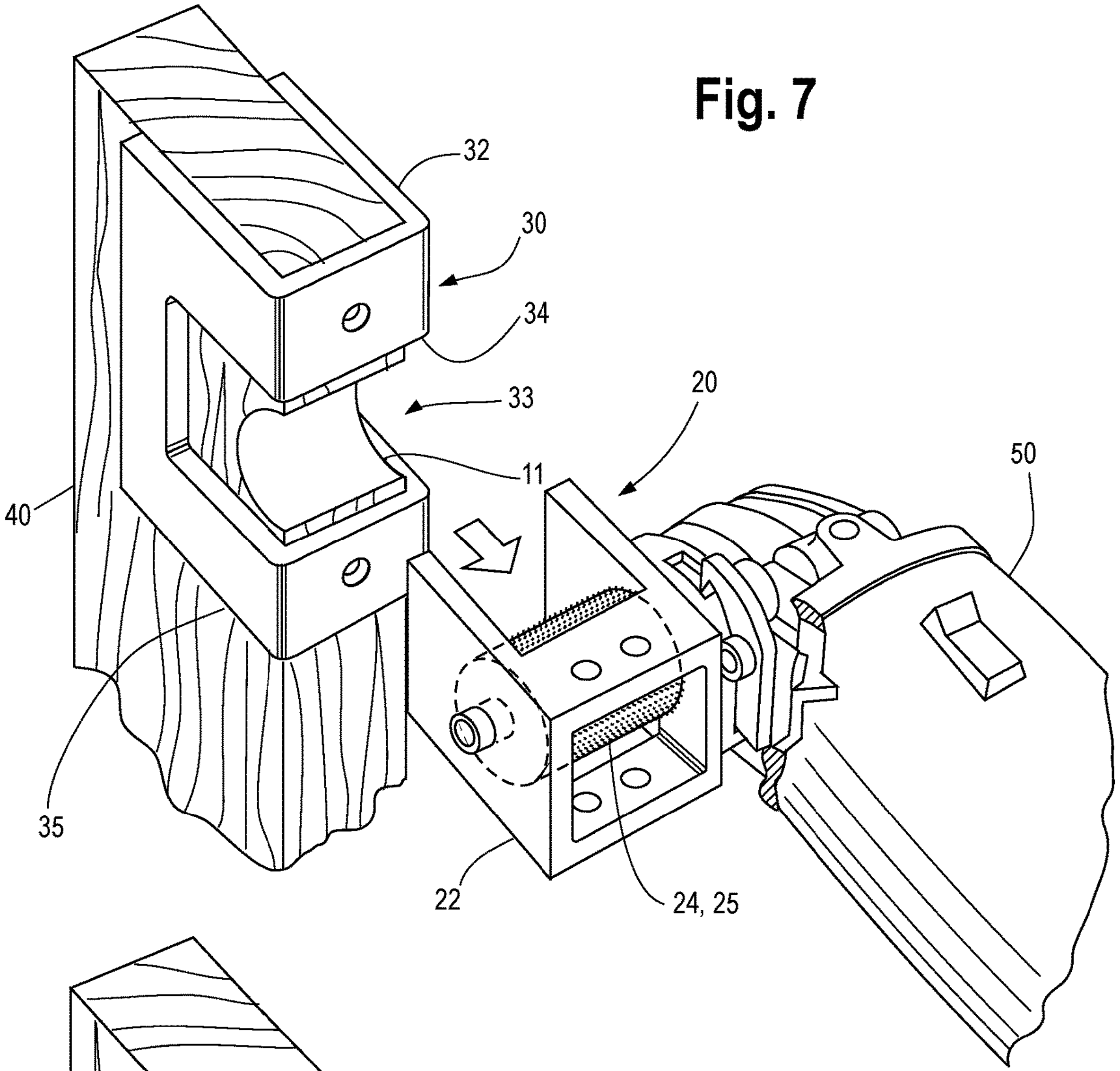
FIG. 7 is a perspective view of an embodiment of the invention.

FIG. 7 shows a workpiece 40 and the notch cutting system 10 after the system has been utilized to cut a notch 11 in the workpiece. The notch cutter 20 is withdrawn from the workpiece 40 and the cutter frame 22 is disengaged from the cutter guide 30 exposing the notch 11. Also shown is a portion of a rotary driver 50 connected to the notch cutter 20.

Figure 8:
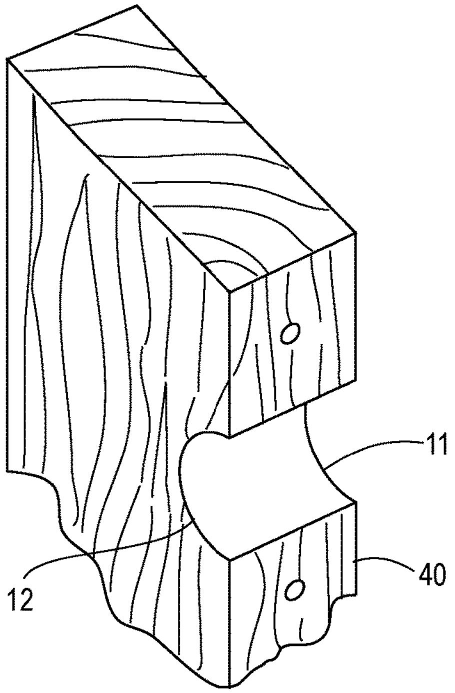
FIG. 8 is a perspective view of the workpiece after cutting a notch.

FIG. 8 shows the workpiece 40 after the notch 11 has been cut and displays the controlled depth and full radius 12 of the resulting notch.

Figure 9:
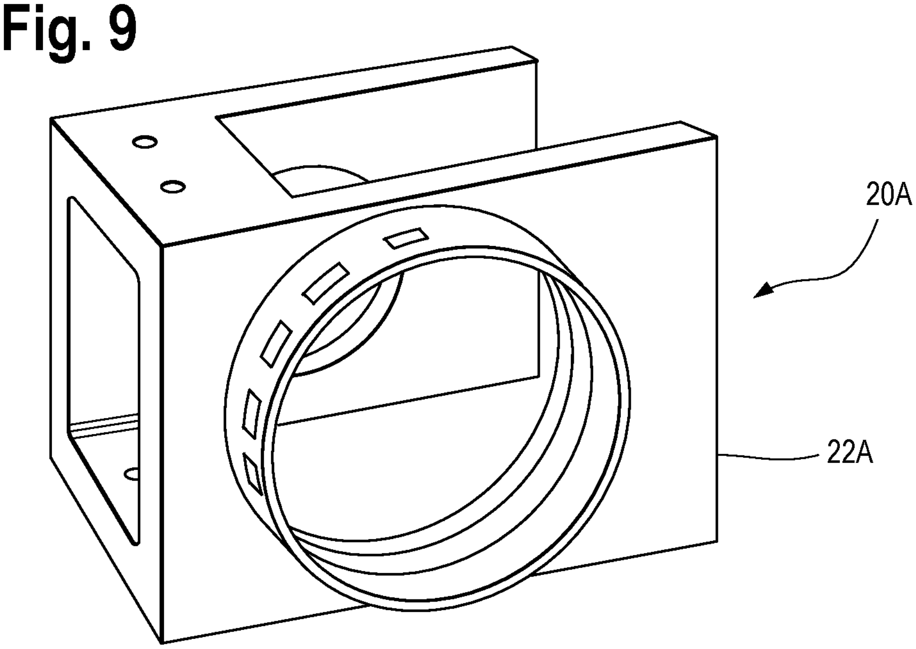
FIG. 9 is a perspective view of another embodiment of a notch cutter.
Figure 10:
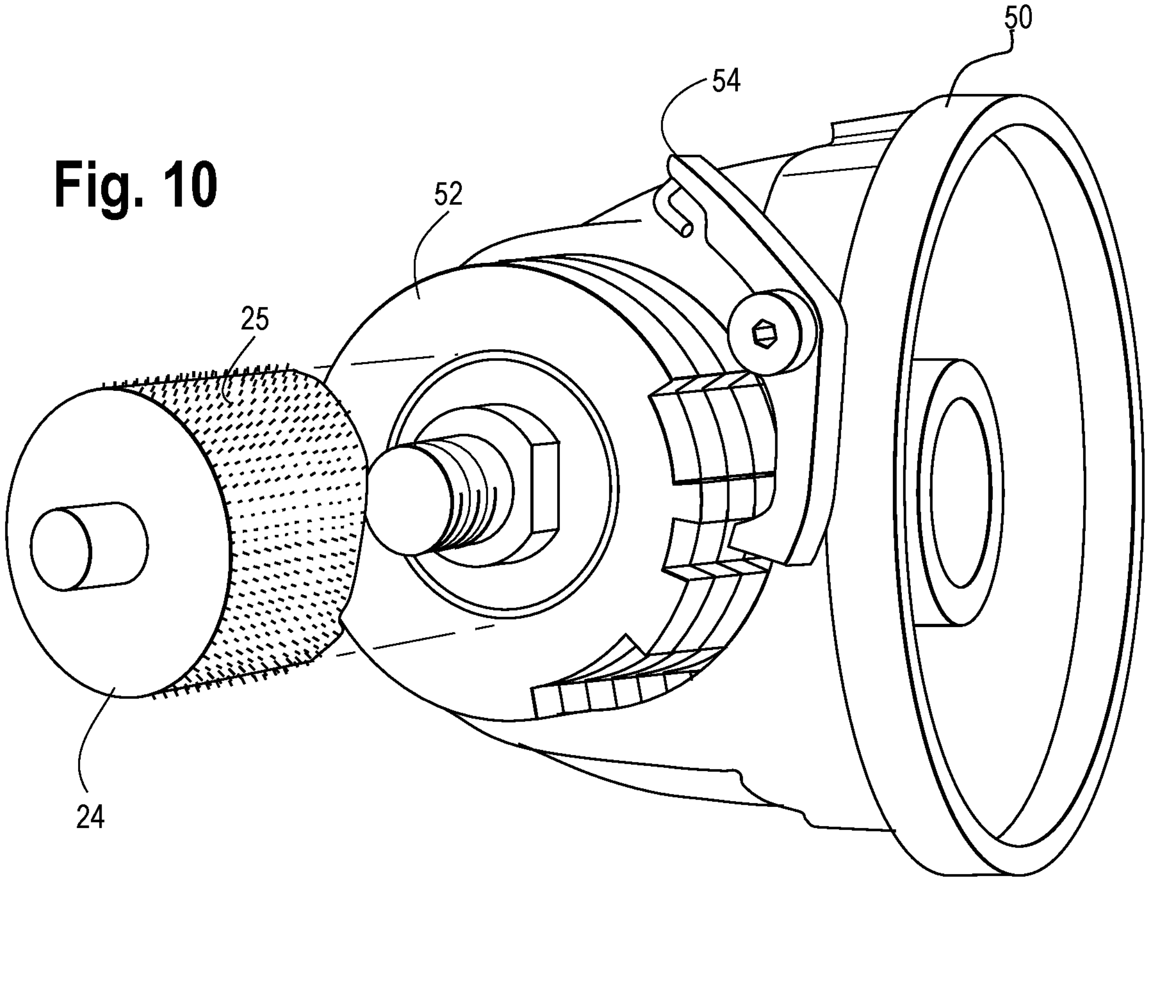
FIG. 10 is a perspective view of a driver with a threaded connection for direct mounting a cylindrical cutter.

In FIGS. 9 and 10, an embodiment of a notch cutter 20A is shown in which the cylindrical cutter 24 mounts directly to the rotary driver 50 via a threaded connection and the cutter frame 22 fits over the cylindrical cutter 24 and also connects directly to the rotary driver 50. A cutter collar 37 is configured to fit over a driver shank 52 and is locked in place by a driver pawl 54.

The rotary driver utilized by the notch cutting system may have various configurations. For example, the rotary driver may be a commercially available hand tool such as a grinder. Some common grinders that may be utilized include those manufactured by Makita™, Dewalt™, and Bosch™. Also, the rotary driver may be cordless (i.e., battery powered) or corded (i.e., AC powered). Alternatively, the rotary driver may be pneumatically powered, hydraulically powered, and may be powered by other appropriate means.

It will be understood that many of the aspects of the notch cutting system and method described above may be varied to optimize ease-of-use and to enhance user experience. For example, the shape of the aperture may be configured to produce a particular cutting path. Similarly, the dimensions of the cutting element and other elements of the invention may vary.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The invention claimed is:

1. A method of cutting a transverse notch into a workpiece, the transverse notch extending across a width of the workpiece, the method comprising:

- mounting a cutter guide to a workpiece, the cutter guide defining a notch cutting path into the workpiece;
- engaging a cutter frame with the cutter guide, the cutter frame including a cylindrical cutting element with a circumferential cutting surface, the cutting element being mounted for rotation about a cutter axis; and
- notching the workpiece along the cutting path and across the entire width of the workpiece, by rotating the cutting surface with a drive motor while moving the cutter frame along the cutting path.

2. The method of claim 1, further comprising notching the workpiece along the cutting path in a single pass of the cutter frame along the cutting path.

3. The method of claim 1, wherein the cutting path includes a start point and an end point and wherein the cutter guide is fixed in position on the workpiece while the cutter frame proceeds from the start point to the end point.

* * * * *